United States Patent [19]

Michel et al.

[11] Patent Number: 5,333,048
[45] Date of Patent: Jul. 26, 1994

[54] POLARIZING INTERFEROMETRIC DISPLACEMENT MEASURING ARRANGEMENT

[75] Inventors: Dieter Michel; Erwin Spanner, both of Traunstein, Fed. Rep. of Germany

[73] Assignee: Dr. Johannes Heidenhain GmbH, Traunreut, Fed. Rep. of Germany

[21] Appl. No.: 50,733

[22] Filed: Apr. 20, 1993

Related U.S. Application Data

[63] Continuation of Ser. No. 777,747, Oct. 16, 1991, abandoned.

[30] Foreign Application Priority Data

Oct. 18, 1990 [DE] Fed. Rep. of Germany ....... 4033013

[51] Int. Cl.$^5$ .............................................. G01B 9/02
[52] U.S. Cl. .................... 356/351; 356/354; 356/356; 250/237 G
[58] Field of Search ............... 356/351, 354, 356, 373, 356/374, 375, 395; 250/237 G, 237.16, 237.14, 225

[56] References Cited

U.S. PATENT DOCUMENTS

| | | | |
|---|---|---|---|
| 3,726,595 | 4/1973 | Matsumoto | 356/356 |
| 3,738,753 | 6/1973 | Huntley, Jr. | 356/354 |
| 4,629,886 | 12/1986 | Akiyama et al. | 250/237 G |
| 4,776,701 | 10/1988 | Pettigrew | 356/356 |
| 4,970,388 | 11/1990 | Nishimura et al. | 250/237 G |
| 5,035,507 | 7/1991 | Nishioki et al. | 356/356 |

FOREIGN PATENT DOCUMENTS

| | | |
|---|---|---|
| 0330810A1 | 7/1987 | European Pat. Off. |
| 163362B1 | 6/1988 | European Pat. Off. |
| 3700906A1 | 7/1987 | Fed. Rep. of Germany |
| 2185314A | 7/1987 | United Kingdom |

OTHER PUBLICATIONS

Design Engineering, Feb. 1989, "Linear Encoder Matches Resolution of Laser Interferometer", pp. 14–15.

Philips Technisch Tijdschrift, 1989, "Nauwkeurige Digitale Verplaatsingsmetingen Met Optische Middelen", pp. 153–164.

Dissertation Hock, "Photoelektrische Messung Der Änderung Von Längen Oder Winkelpositionen Mit Hilfe Von Beugungsgitteren," 1975.

Patent Abstracts of Japan, vol. 012413, Nov. 2, 1988 of Japanese Publication Number JP63151802 published Jun. 24, 1988.

Patent Abstracts of Japan, vol. 013587, Dec. 25, 1989 of Japanese Publication Number JP1250803 published Oct. 5, 1989.

*Primary Examiner*—Samuel A. Turner
*Assistant Examiner*—LaCharles P. Keesee, II
*Attorney, Agent, or Firm*—Willian Brinks Hofer Gilson & Lione

[57] ABSTRACT

A polarizing optical arrangement wherein a linearly polarized signal beam cluster is generated. The signal beam cluster is created from interfering partial beam clusters and is linearly polarized. The azimuth of oscillation of the linearly polarized signal beam cluster is dependent on the mutual phase relationship of the aforementioned partial beam clusters. A splitter grating splits the linearly polarized signal beam cluster into partial beam clusters that are analyzed by analyzers, detected by photoelectric transducers and phase-shifted electrically from one another.

11 Claims, 4 Drawing Sheets

5,333,048

POLARIZING INTERFEROMETRIC DISPLACEMENT MEASURING ARRANGEMENT

This application is a continuation of application Ser. No. 07/777,747, filed Oct. 16, 1991 now abandoned.

BACKGROUND OF THE INVENTION

1. Field of the Invention

The invention relates to a polarizing optical arrangement, and more particularly to an optical arrangement that generates linearly polarized beam clusters before splitting the beams by a splitter grating to generate phase-displaced signals which form a rotary field without generating a constant light signal.

2. Description of the Prior Art

Various length and angle measuring instruments use polarizing optical arrangements. Foe example, U.S. Pat. No. 5,035,507 (Nishioki et al.) corresponding to German Published, Non-Examined Patent Application 39 42 385, describes a length measuring arrangement in which measurement signals are generated by means of refraction gratings, polarizers, beam splitters, a quarter-wavelength plate, analyzers, and optical detectors. The measured signals have a phase displacement of 45° from a reference signal. The reference signal is a constant light signal furnished by detector 22A. The constant light signal does not interfere with the other partial beam clusters thus interference bands are created.

In an optical arrangement according to the Nishioki et al. patent, the relative phase position of the interfering partial beam clusters is fixedly determined by the physical construction of the arrangement. Therefore after the splitter grating the partial beam clusters are created by means of analyzers 28B and 28C, a quarter-wavelength plate and detectors which generate signals that are phase-displaced 90° from one another. By reason of the physical construction of the arrangement, no other phase relationship is possible.

An object of the present invention is to create a polarizing optical arrangement in an interferometric measuring instrument having interfering partial beam clusters of the most equal possible modulation and intensity can be generated by being split open at a grating.

Another object of the present invention is the simple evaluation of identical types of signals, a so-called rotary field, for instance, three signals phase-shifted from one another by 120°.

SUMMARY OF THE INVENTION

The present invention provides a method and apparatus for generating phase-shifted signals in interferometric measuring instruments using a polarizing optical arrangement. A linearly polarized signal beam cluster is generated from interfering partial beam clusters. The polarized signal beam cluster has an azimuth of oscillation dependent upon the mutual phase relationship of the interfering partial beam clusters. A splitter grating splits the polarized signal beam cluster into at least two beam clusters. The beam clusters generated by the splitter grating are detected by detectors. The detected signals have a mutual phase relationship dependent upon the orientation of analyzers located between the splitter grating and the detectors in the path of the generated beam clusters.

Further objects and advantages of this invention will become more apparent and readily appreciated from the following detailed description of the present invention, taken in conjunction with the accompanying drawings.

DETAILED DESCRIPTION OF THE PREFERRED EMBODIMENTS

Figure 1:
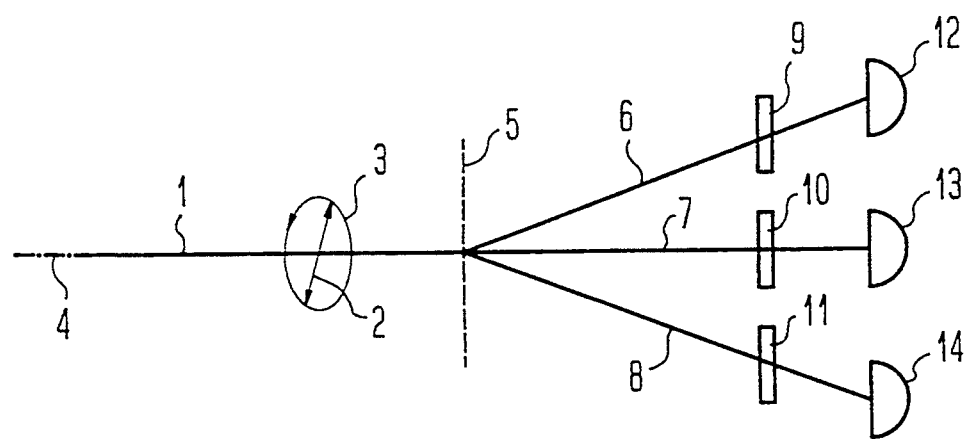
FIG. 1 is a schematic view of a preferred embodiment of an arrangement for splitting open beam clusters by means of a grating.

FIG. 1 illustrates a linearly polarized signal beam cluster 1, which is furnished by an interferometric measuring instrument to be described with respect to FIGS. 4–6 below entering an optical arrangement according to the present invention.

A special feature of this linearly polarized signal beam cluster 1 is the rotation of its plane of oscillation otherwise known as the azimuth of oscillation. The azimuth of oscillation of the linearly polarized wave signal beam cluster 1 depends upon the mutual phase relationship of the previously interfering partial beam clusters. This is represented by an arrow 2 shown in a circle 3. Splitter grating 5 creates three beam clusters 6, 7 and 8 of equal intensity from beam cluster 1.

Analyzers 9, 10 and 11 are disposed in the beam paths of the various beam clusters 6, 7 and 8. The analyzers 9, 10 and 11 are offset by 60° from one another. Upon a rotation of the plane of oscillation 2 by 360°, two oscillation periods result in the electrical signal, so that with three analyzers 9, 10 and 11 oriented geometrically at angles of 60° from one another, three signals offset electrically by 120° from one another can be detected by the photoelectric transducers 12, 13 and 14.

Figure 2:
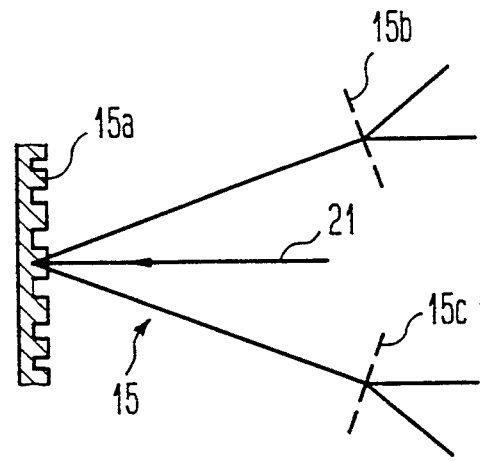
FIG. 2 illustrates a first alternate grating to the grating illustrated in FIG. 1.

FIG. 2 illustrates a first alternate to the grating shown in FIG. 1. The splitter grating 5 of FIG. 1 can be embodied by a grating cascade 15. The grating cascade 15 is a series-connected gratings 15a, 15b and 15c. Grating 15a is embodied as a laminar grating. Four partial beam clusters are generated by the grating cascade 15. An additional analyzer and detector must be provided in the arrangement shown in FIG. 1 to detect the fourth beam. Use of the grating cascade 15 generates four symmetrical partial beam clusters of equal intensity phase-displaced 90° from one another. These signals in turn together form a rotary field.

Figure 3:
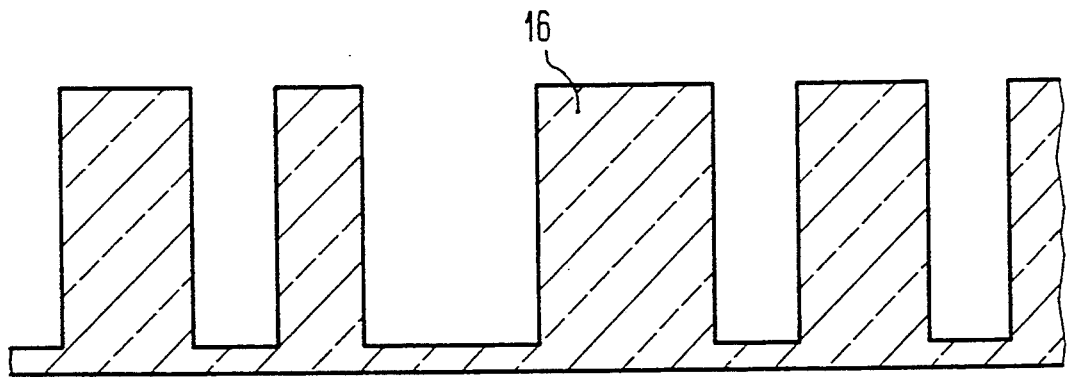
FIG. 3 illustrates a second alternate grating to the gratings illustrated in FIGS. 1 and 2.

FIG. 3 illustrates a second alternate to the grating shown in FIG. 1. The splitter grating 5 of FIG. 1 may be embodied as a so-called "Dammann" grating 16. Gratings of this kind are especially well suited for purposely varying the intensity of the partial beam clusters.

Figure 4:
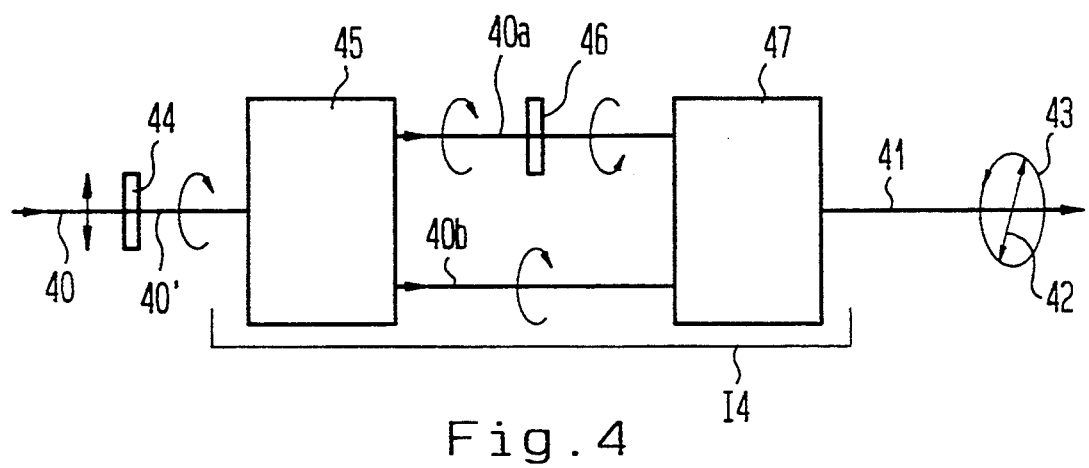
FIG. 4 illustrates an interferometric measuring instrument according to a first embodiment.
Figure 5:
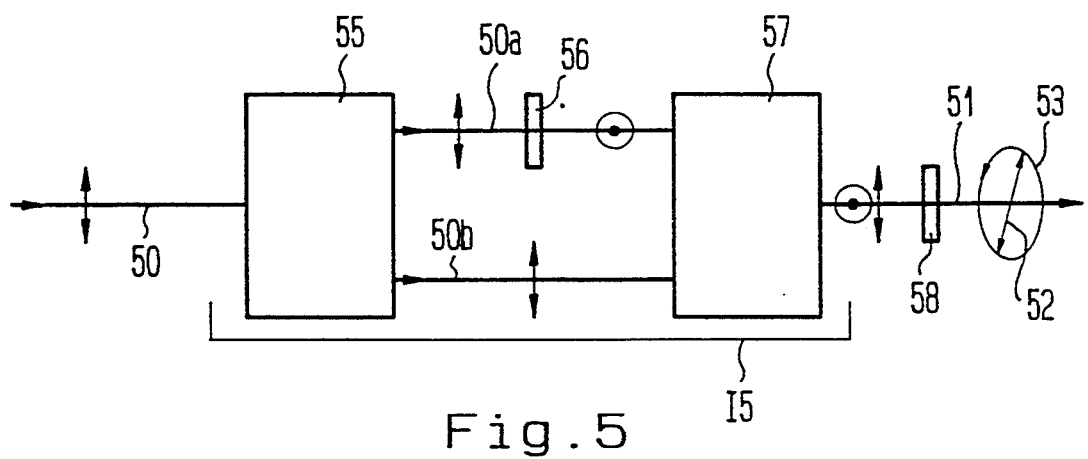
FIG. 5 illustrates an interferometric measuring instrument according to a second embodiment.
Figure 6:
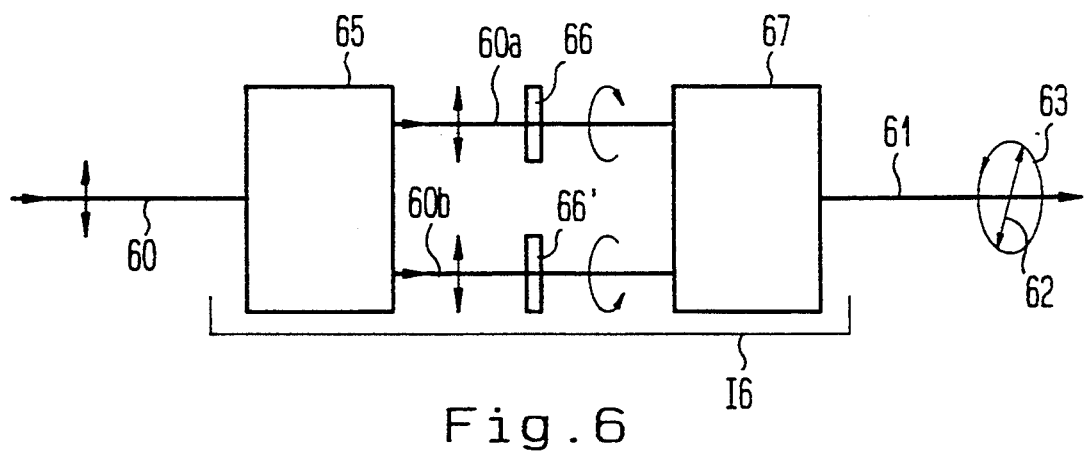
FIG. 6 illustrates an interferometric measuring instrument according to a third embodiment.

FIGS. 4, 5 and 6 illustrate interferometric measuring arrangements used to create the rotating signal beam clusters shown in FIG. 1.

In the example of FIG. 4, a linearly polarized beam cluster 40 passes through a quarter-wave plate 44, also known as a $\lambda/4$ plate, which is oriented at an angle of 45° from the linearly polarized beam cluster 40. The resulting circularly polarized beam cluster 40' passes through a beam splitter 45. Two partial beam clusters 40a and 40b are generated from the beam splitter 45. By means of a half-wave plate 46, also called a $\lambda/2$ plate, the circularly polarized partial beam cluster 40a is circularly polarized in the opposite direction from the circularly polarized partial beam cluster 40b. The two beams are brought into interference at beam uniter 47.

A relative phase variation of the partial beams is created by either variably adjusting the optical distances travelled, for instance, or by shifting phase gratings in the form of beam splitters 45 or beam uniters 47. The structural unit comprising the beam splitter 45, $\lambda/2$ plate 46 and beam uniter 47 represents a conventional interferometer I4. FIGS. 5 and 6 also illustrate conventional interferometers I5 and I6. Since these interferometrically functioning components I4, I5 and I6 are known to those skilled in the art, they are only briefly described herein.

FIG. 5 illustrates an interferometer I5 according to a second embodiment of the present invention. The beam splitting in this interferometer I5 takes place in a beam splitter 55. Interference takes place in a beam uniter 57. A half-wave plate or $\lambda/2$ plate 56 is placed in the beam path 50a of the interferometer I5. The partial beam clusters 50a and 50b, polarized vertically with respect to one another by a $\lambda/2$ plate 56, travel after their interference through a $\lambda/4$ plate 58. The result is a linearly polarized signal beam cluster 51, the azimuth of oscillation of which, arrow 52, depends on the mutual phase relationship of the partial beam clusters 50a and 50b.

FIG. 6 illustrates an interferometer I6 according to a third embodiment of the present invention. The prerequisites are essentially equivalent to those of FIGS. 4 and 5. Identical characteristics are assigned the same reference numerals but with the number of the respective drawing figure preceding them.

A linearly polarized beam cluster 60 is split up in a beam splitter 65. Both partial beam clusters 60a and 60b pass through $\lambda/4$ plates 66 and 66', which are at an angle of +45° (66) and −45° (66') from the polarization direction of the partial beam clusters 60a and 60b. The following right-circularly and left-circularly polarized partial beam clusters are united in the beam uniter 67 and at the output form a linearly polarized signal beam cluster 61, the azimuth of oscillation of which, arrow 62, is dependent on the relative phase relationship of the two partial beam clusters 60a and 60b. Once again an interferometer is formed which is identified by reference symbol I6.

Figure 7:
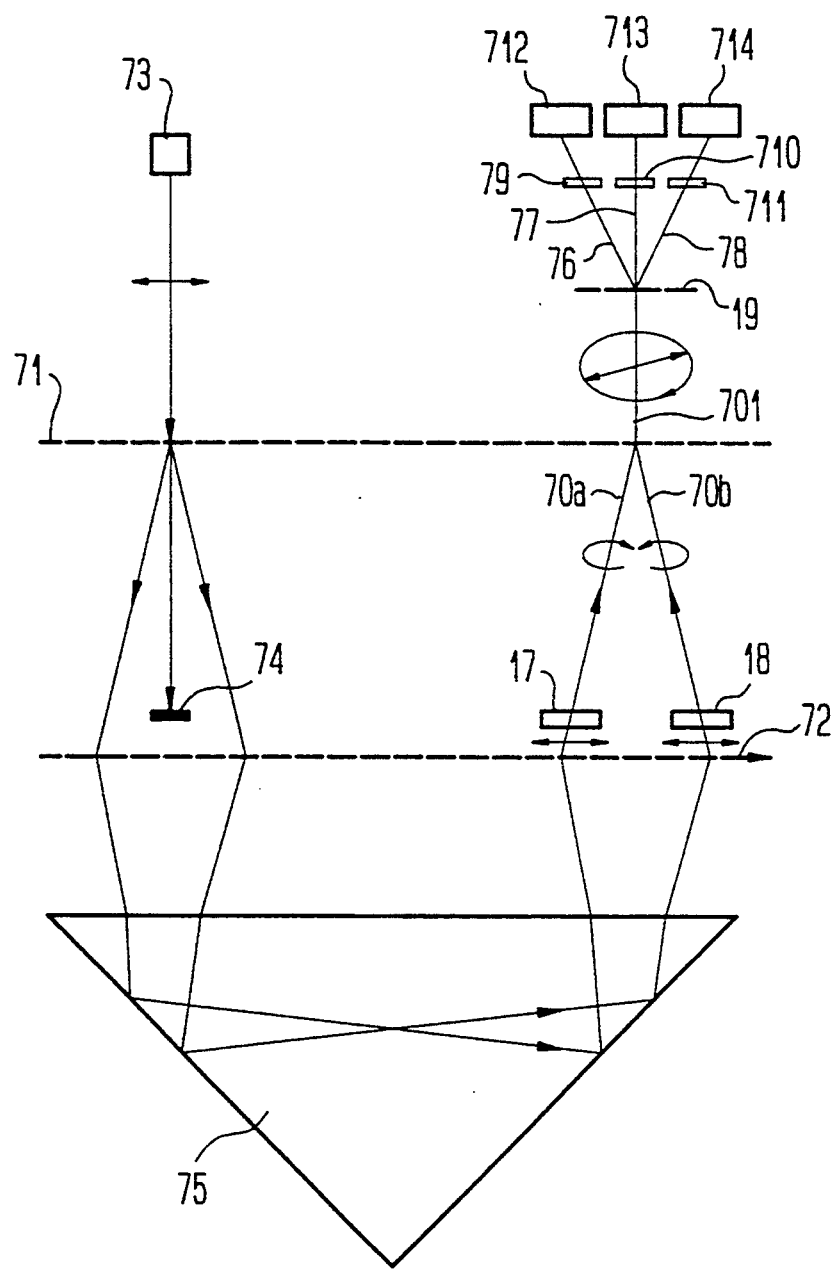
FIG. 7 illustrates a length-measuring instrument with a polarizing optical arrangement.
Figure 8:
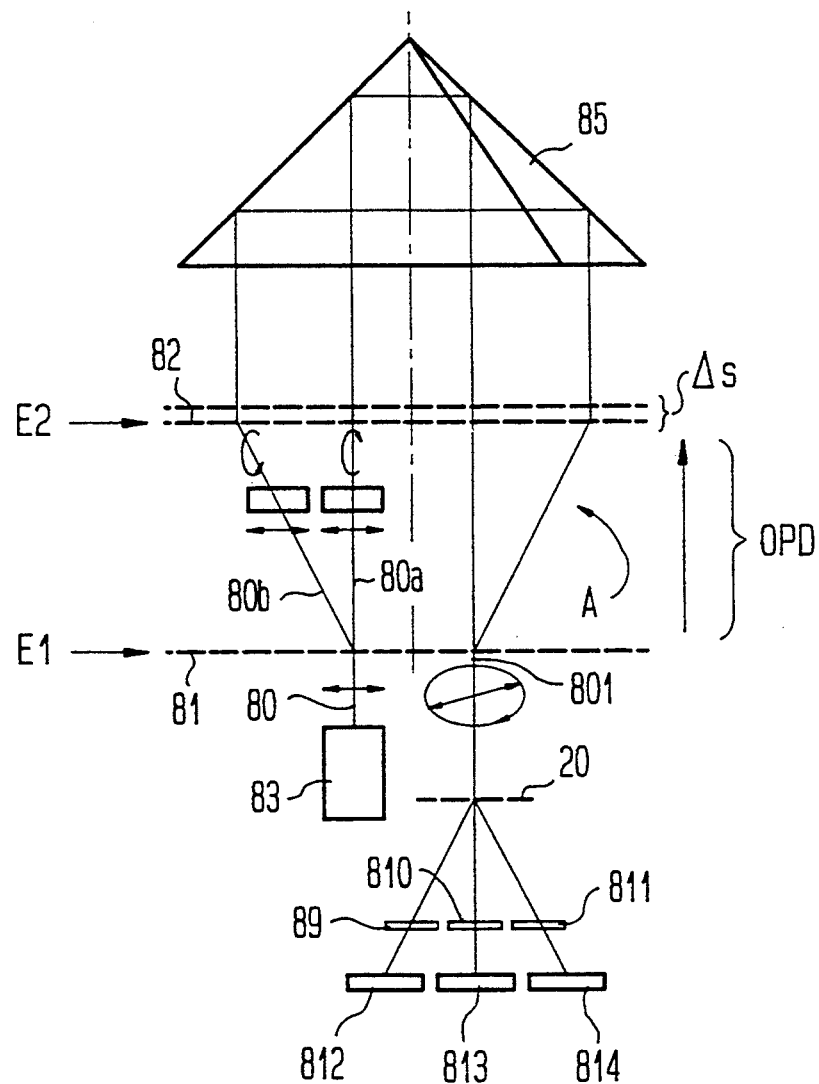
FIG. 8 illustrates a spacing sensor having a polarizing optical arrangement.

FIGS. 7 and 8 illustrate exemplary applications in which the polarizing optical arrangement according to the present invention can be used particularly advantageously.

FIG. 7 illustrates length-measuring instrument with a polarizing optical arrangement. A diffraction grating in the form of a phase grating 72 is secured to a first object, not shown. A diffraction grating 71 is likewise secured to a second object not shown. The first object is movable relative to the second object. The first object moves with phase grating 72 parallel to a second object with phase grating 71 as indicated by the arrow associated with grating 71.

Light is transmitted by an illumination device preferably a laser 73 and diffracted at the phase grating 71. Diffracted partial beam clusters $-\Phi$ and $+\Phi$ strike the second diffraction grating 72 where they are diffracted once again. The zero order diffraction beam is filtered by means of a screen 74 before this partial beam cluster strikes the second diffraction grating 72.

The beams diffracted by the second diffraction grating 72 impinge upon a retroreflective element. Retroreflective elements are well known to those skilled in the art. For exemplary purposes a triple mirror 75 has been selected. The diffraction grating 72 and the triple mirror 75 are positioned with respect to one another so that the partial beam clusters $-\Phi$ and $+\Phi$ intersect one another at only a single point. After leaving the triple mirror 75, the partial beam clusters $-\Phi$ and $+\Phi$ are diffracted once again upon passing through the diffraction grating 72. Quarterwave $\lambda/4$ plates 17 and 18 are oriented at +45° and −45° from the plane of oscillation and are located in the beam paths between the phase gratings 71 and 72. Upon passing through these $\lambda/4$ plates 17 and 18, the partial beam clusters 70a and 70b are circularly polarized in opposite directions. Upon the interference of beams 70a and 70b at the grating 71, a signal beam cluster 701 is generated, as previously described, the azimuth of oscillation of beam 701 depends upon the relative phase relationship of the two partial beam clusters 70a and 70b.

Splitter grating 19 splits the signal beam cluster 701 into three partial beam clusters 76, 77 and 78 which each pass through a respective analyzer 79, 710 and 711 that are oriented at angles of 60° from one another, and are deflected onto photoelectric transducers 712, 713 and 714.

FIG. 8 illustrates a spacing sensor having a polarizing optical arrangement. A spacing sensor A shown in FIG. 8 has a laser 83 as an illuminating device, which casts a linearly polarized illuminating beam 80 on a diffraction grating 81 that is located in a plane E1. The illuminating beam 80 is split by the diffraction grating 81 into two partial beam clusters 80a and 80b which travel in different directions. It should be noted here that it is understood that other optical elements for splitting the illuminating beam 80 may be used. A further diffraction grating 82, at which the partial beam clusters 80a and 80b are diffracted once again, is located in a plane E2, parallel to the plane E1 of the location of splitting where the diffraction grating 81 is located.

After the deflection at the diffraction grating 82, the partial beam clusters 80a and 80b extend parallel to one another to enter a triple prism 85, pass through the prism 85, and strike the diffraction grating 82 again in the plane E2 still in the form of parallel partial beam clusters. At the diffraction grating 82 the beams are diffracted in such a way that they are brought into interference with one another at the diffraction grating 81 in the plane E1. From the time that the beam 80 is split until beam 801 is created, the partial beam clusters 80a and 80b travel optical paths of different lengths known as the Optical Path Difference, abbreviated OPD.

If the spacing between the diffraction gratings 81 and 82 in the planes E1 and E2 changes, then the optical path difference OPD of the partial beam clusters 80a and 80b changes as well. More specifically, if the planes E1 and E2 move closer together, the optical path difference OPD becomes smaller. If the spacing between the planes E1 and E2 increases, the optical path difference OPD also increases.

A relative motion in the direction normal to the two diffraction gratings 81 and 82 results in an optical path difference, $\Delta$OPD, of the interfering partial beam clusters 80a and 80b. The optical path difference $\Delta$OPD is directly proportional to the change, $\Delta$s in spacing. The change $\Delta$s can be detected as a bright/dark modulation by a detector device. A polarizing optical arrangement is located behind the laser 83 in space and will be described only briefly below, with reference to the above descriptions of the drawings.

From the contrarily circularly polarized partial beam clusters 80a and 80b, after they are united at the grating 81, a linearly polarized signal beam cluster 801 is generated. Beam cluster 801 is diffracted at a splitter grating 20 and delivered to both analyzers 89, 810 and 811. The output of analyzers 89, 810 and 811 impinge upon detectors 812, 813 and 814. As described with respect to FIGS. 1 and 7 the analyzers 89, 810 and 811 are orientated geometrically at 60° from one another thus creating three signals offset by 120° from one another at detectors 812, 813 and 814.

The descriptions of the exemplary embodiments in no way limit the application of the polarizing optical arrangements to length measuring instruments. Angle measurements as well as other applications are encompassed by the present invention.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A polarizing optical arrangement for generating phase-shifted signals in interferometric measuring instruments comprising:
   means for generating a linearly polarized signal beam cluster from interfering partial beam clusters, said polarized signal beam cluster having an azimuth of oscillation dependent upon the mutual phase relationship of said interfering partial beam clusters;
   a splitter grating for splitting said polarized signal beam cluster to generate at least two beam clusters; and
   means for detecting said generated beam clusters created by said splitter grating to create detected signals, said detected signals having a mutual phase relationship dependent upon the orientation of analyzers located between said splitter grating and said means for detecting in the path of said generated beam clusters.

2. A polarizing optical arrangement for generating phase-shifted signals in interferometric measuring instruments comprising:
   means for generating a linearly polarized signal beam cluster from interfering partial beam clusters, said polarized signal beam cluster having an azimuth of oscillation dependent upon the mutual phase relationship of said interfering partial beam clusters;
   a splitter grating for splitting said polarized signal beam cluster to generate at least two beam clusters;
   means for analyzing said generated beam clusters from said splitter grating orientated in the path of said generated beams; and
   means for detecting said generated beam clusters created by said splitter grating to create detected signals, said detected signals having a mutual phase relationship dependent upon the orientation of said analyzers.

3. The polarizing optical arrangement according to claim 1 wherein said analyzers are oriented at an angle of $(1/i) \times 180°$ from one another where i equals the number of beams generated by said splitter grating.

4. The polarizing optical arrangement according to claim 1 wherein said splitter grating is either one of a transmission and reflection grating.

5. The polarizing optical arrangement according to claim 1 wherein said splitter grating comprises a grating cascade.

6. The polarizing optical arrangement according to claim 1 wherein said splitter grating comprises a Dammann grating.

7. The polarizing optical arrangement according to claim 4 wherein said splitter grating comprises a laminar grating.

8. The polarizing optical arrangement according to claim 4 wherein said transmission grating is a phase grating.

9. A method for generating phase-shifted signals in interferometric measuring instruments using a polarizing optical arrangement comprising the steps of:
   generating a linearly polarized signal beam cluster from interfering partial beam clusters, said polarized signal beam cluster having an azimuth of oscillation dependent upon the mutual phase relationship of said interfering partial beam clusters;
   splitting said polarized signal beam cluster to generate at least two beam clusters; and
   detecting said generated beam clusters created by said splitter grating to create detected signals, said detected signals having a mutual phase relationship dependent upon the orientation of analyzers located between said splitter grating and said means for detecting in the path of said generated beam clusters.

10. A method according to claim 9 further comprising the step of orientating said analyzers at an angle of $(1/i) \times 180°$ from one another where i equals the number of beams generated.

11. A polarizing optical arrangement for generating phase-shifted signals in interferometric measuring instruments comprising: beam paths;
   a beam splitter for splitting a linearly polarized beam cluster into at least two
   a half-wave plate disposed in one beam path;
   a beam uniter located downstream of the half-wave plate for uniting the beams in the beam paths;
   a quarter wave plate for receiving the beam from the beam uniter and generating a linearly polarized beam having an azimuth of oscillation which depends upon the mutual phase relationship of the partial beam clusters;
   a splitter grating for splitting the polarized signal beam cluster to generate at least two beam clusters; and
   means for detecting the generated beam clusters created by the splitter grating to create detected signals, said detected signals having a mutual phase relationship dependent upon the orientation of analyzers located between said splitter grating and said means for detecting in the path of said generated beam clusters.

* * * * *